2 Sheets—Sheet 1.

J. E. DONOVAN.
Sewing-Machine Table.

No. 225,809. Patented Mar. 23, 1880.

WITNESSES:
Jas. E. Hutchinson.
Henry C. Hazard.

INVENTOR-
Jno. E. Donovan, by
Geo. S. Prindle, his Atty

2 Sheets—Sheet 2.

J. E. DONOVAN.
Sewing-Machine Table.

No. 225,809. Patented Mar. 23, 1880.

UNITED STATES PATENT OFFICE.

JOHN E. DONOVAN, OF CINCINNATI, OHIO.

SEWING-MACHINE TABLE.

SPECIFICATION forming part of Letters Patent No. 225,809, dated March 23, 1880.

Application filed December 6, 1879.

*To all whom it may concern:*

Be it known that I, JOHN E. DONOVAN, of Cincinnati, in the county of Hamilton, and in the State of Ohio, have invented certain new and useful Improvements in Sewing-Machine Tables; and I do hereby declare that the following is a full, clear, and exact description thereof, reference being had to the accompanying drawings, making a part of this specification, in which—

Figure 1:
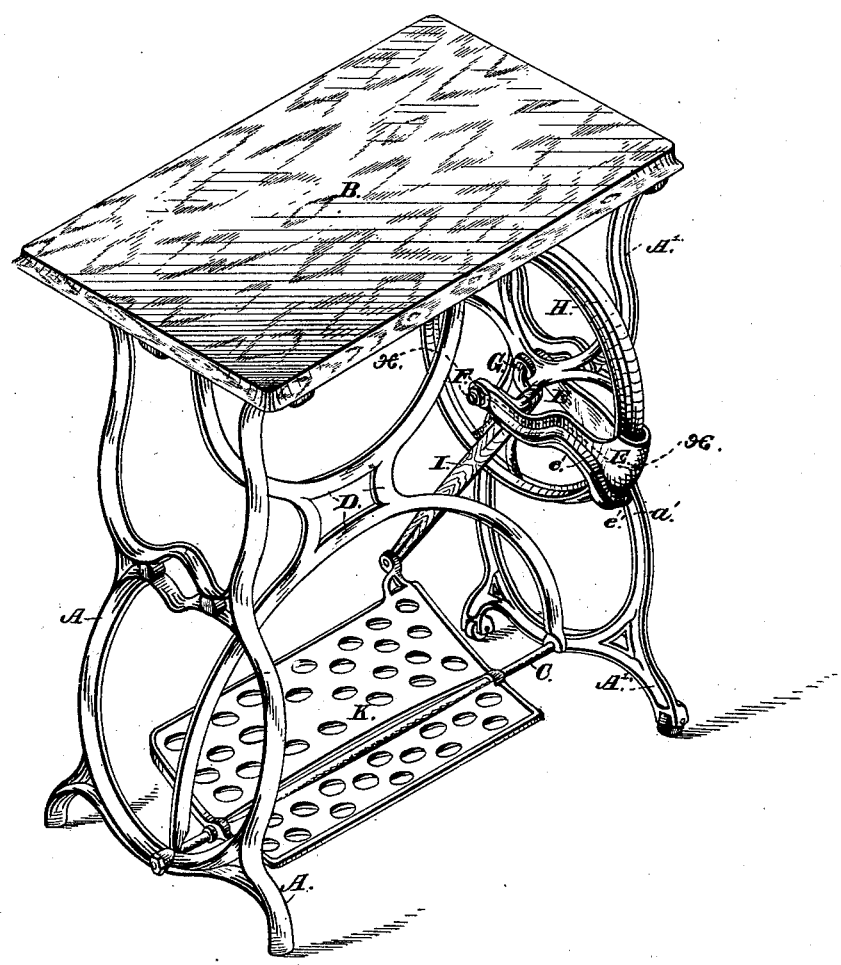
Figure 2:
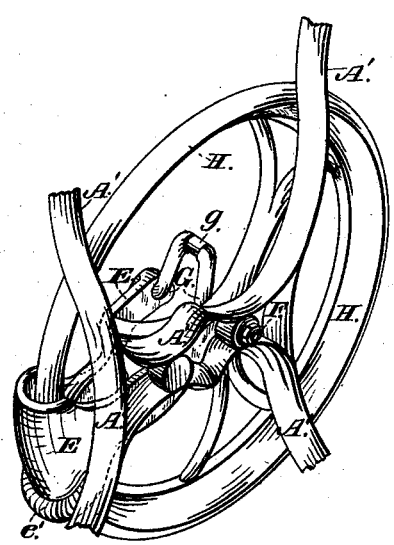
Figure 3:
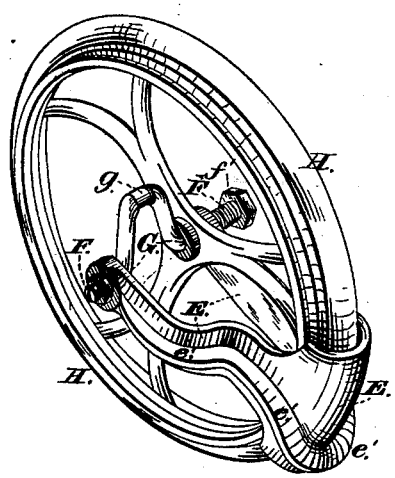
Figure 4:
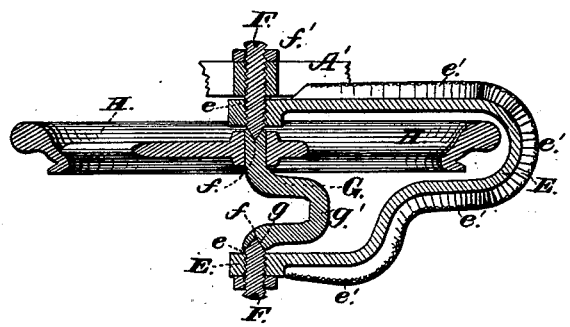

Figure 1 is a perspective view of a table containing my improvements. Fig. 2 is a like view of one end of the same, showing the means employed for connecting therewith the balance-wheel yoke. Fig. 3 is a perspective view of said yoke and balance-wheel separated from the table, and Fig. 4 is a central section of said parts upon line $x\ x$ of Fig. 1.

Letters of like name and kind refer to like parts in each of the figures.

In the construction of sewing-machine tables it is the almost invariable custom to journal the balance or driving wheel upon a stud which is secured to and projects inward from some part of the frame, and to journal the upper end of the pitman upon a crank-pin which projects inward from one of the arms of said wheel at a suitable distance from its axial bearing. This method has been open to serious objections, among which are the great accuracy required in the fitting of the wheel upon its bearing in order to prevent lateral irregularity in the movement of its rim, the unequal wear upon the stud and upon the axial opening in said wheel in consequence of the thrust of the pitman, and the large size of said bearing-stud required to enable it to withstand in any degree such unequal side pressure, resulting in the creation of a large amount of friction-surface, which materially increased the labor of running the machine.

To obviate these difficulties is the design of my invention, which consists, principally, as an improvement in sewing-machine tables, in a yoke provided within its ends with coincident openings for the reception of the journals of a crank-shaft for a balance-wheel, and adapted to be attached to or removed from the frame of the table without relative displacement of said shaft, substantially as and for the purpose hereinafter specified.

It consists, further, in the means employed for connecting the yoke to or with the frame of the table, substantially as and for the purpose hereinafter shown.

It consists, finally, in the combined crank-shaft bearing and dress-protector, substantially as and for the purpose hereinafter set forth.

In the annexed drawings is shown an ordinary sewing-machine table, in which A and A' represent two end pieces or legs, that are secured at their upper ends to and support a top, B, and at their lower ends are connected together by means of a brace-rod, C, while an X-shaped brace, D, extends between the lower ends of said legs at the point where said rod passes through and the upper rear ends of the same where they are attached to said top, and give to said parts all necessary rigidity.

Upon the inner face of one of the legs A' is secured a yoke, E, which has the general shape of the letter U, with one of its arms offset, so as to give increased width to the space between the ends of said arms, while at its forward curved part said yoke has vertically several times the width of said ends.

Passing through each end of the yoke E is an opening, $e$, which has the same axis as and exactly coincides with the opening $e$ in the opposite arm, and is threaded interiorly, and contains a screw, F, that has a pointed inner end, $f$. Extending between the screws F is a shaft, G, which at each end is provided with conical cavity, $g$, that corresponds to and receives the pointed end of one of said screws, said screws thus operating as bearings for and upon which said shaft revolves.

Near the outer end of the shaft G is secured a balance and band wheel, H, of usual form, while between said wheel and the inner end of said shaft is provided a crank, $g'$, upon which is journaled one end of a pitman, I, the opposite end of which is pivoted upon one end of an ordinary treadle, K, that is journaled upon the brace-rod C.

Upon the outer end of each screw F is a nut, $f'$, which operates as a jam-nut and insures the position of its screw when adjusted thereto.

The outer screw, F, has sufficient length to enable it to pass through an opening in one of the legs A', and to receive its nut f' upon the outer side of said leg, so that by screwing said nut firmly down against said leg the yoke E, with the crank-shaft and balance-wheel, will be securely held in place, as shown in Fig. 1.

As arranged, the balance and band wheel is supported upon bearings which are sufficiently separated to give great steadiness and to prevent the thrust of the pitman from causing undue pressure and wear at any point, while from the location of said bearings it is practicable to reduce their bearing-surfaces until but little friction is caused and but little power is necessary for operating the machine.

In order that the yoke E may operate as a dress-protector, its doubled end is turned to the position shown in Fig. 1, and such position insured by means of a rib, $e'$, upon its outer surface, which engages with a groove, $a'$, in the leg A', or by any similar means.

Having thus fully set forth the nature and merits of my invention, what I claim as new is—

1. As an improvement in sewing-machine tables, a yoke provided within its ends with coincident openings for the reception of the journals of a crank-shaft for a balance-wheel, and adapted to be attached to or removed from the frame of the table without displacement of said shaft from its bearings within said yoke, substantially as and for the purpose specified.

2. As a means for combining the yoke E with the leg A', the outer journal-screw, F, contained within and projecting from said yoke through said leg, and the nut $f'$, placed upon the outer end of said screw, said parts being combined in the manner substantially as shown.

3. A combined crank-shaft bearing and dress-protector, consisting of the yoke E, which at its inner ends contains bearings for said shaft, is secured at one end upon the leg A', and has its doubled end extended vertically over the rim of the wheel H, substantially as set forth.

In testimony that I claim the foregoing I have hereunto set my hand this 4th day of December, 1879.

JOHN E. DONOVAN.

Witnesses:
SAML. E. HILLES,
SAM. C. TATUM, Jr.